Jan. 20, 1959     F. W. BARBKNECHT     2,869,308
COTTON PICKER SPINDLE MOUNTING
Filed March 8, 1957
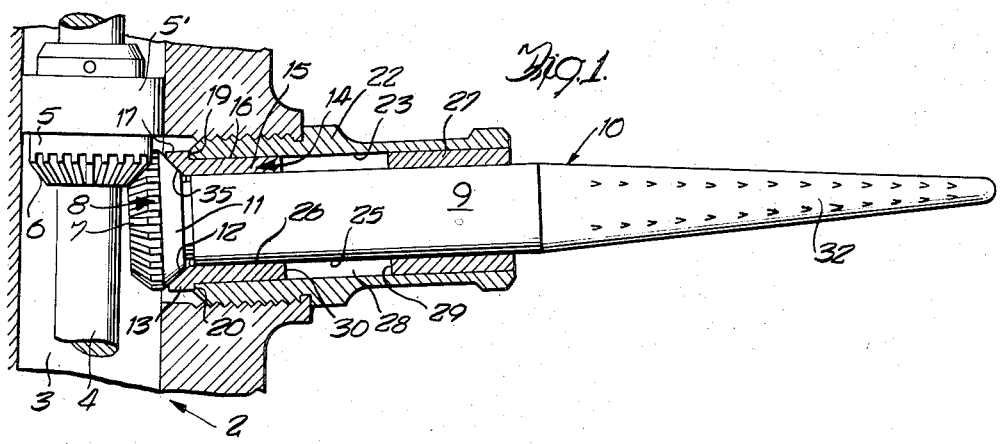
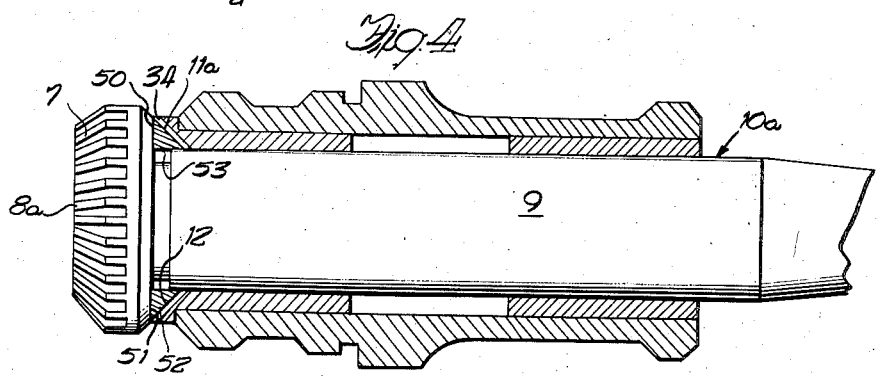
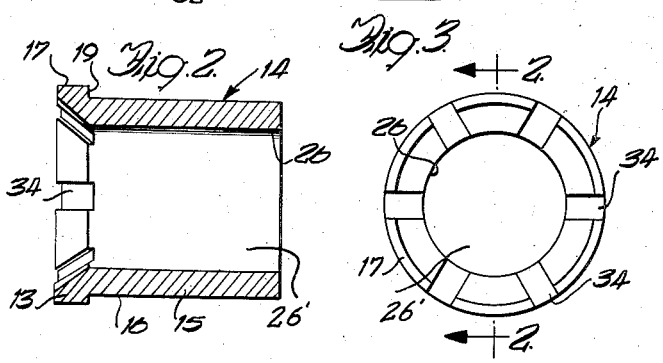
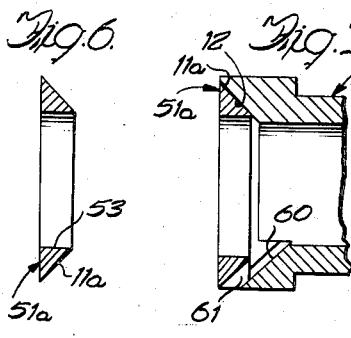
Inventor
Fred W. Barbknecht
By Paul O. Pippel
Attorney ps # United States Patent Office 2,869,308
Patented Jan. 20, 1959

2,869,308

COTTON PICKER SPINDLE MOUNTING

Fred W. Barbknecht, Palos Heights, Ill., assignor to International Harvester Company, Chicago, Ill., a corporation of New Jersey Application March 8, 1957, Serial No. 644,797

8 Claims. (Cl. 56—50)

This invention relates to cotton picker spindles and more specifically to a novel mounting thereof.

Cotton picker spindles of the type under consideration are currently mounted in vertical rows upon a series of bars and each spindle is provided at its inner end with a bevel gear which meshes with a mating gear driven by a shaft on which it is mounted within the picker bar. It is evident that as the bearings upon which the spindles are mounted wear, the relationship between the mating pairs of bevel gears is disturbed, conceivably resulting in increased stresses in the gear train with resultant increase in power required to operate the assembly and if the condition is sufficiently bad so that the gears become mismated the teeth may strip or other damage may result. Further in current constructions of spindles and their mounting within the supporting bearings the spindles are provided with a cylindrical shank portion which rotates within a cylindrical bearing and the inner end of the shank portion is formed with an integral gear which provides a radial thrust surface against an opposing radial thrust surface on a peripheral flange of the cylindrical bearing. It is difficult to introduce lubricant into the spindle bearings while in operation in view of this construction because the high speed of rotation of the spindle gear against an open radial passage in the bushing flange tends to centrifugally disperse the lubricant preventing its entrance into the bearing.

It is therefore a primary object of the invention to improve bearing life and at the same time to improve and control the positioning of the spindle so that its inner end is held in more accurate relationship with the driving bevel gear with which it mates even though there may be considerable wear in the shank-carrying portion of the bearing.

A more specific object of the invention is to provide a novel arrangement of thrust surfaces between the gear of the spindle and the associated bearing so that the bearing surface and the gear thrust surface serve as a centering medium for the gear.

Another object of the invention is to devise, in conjunction with the previous object, a novel arrangement of lubricant passages which serve to draw the lubricant into the spindle bushing as the spindle is rotating.

These and other objects of the invention will become more apparent from the specification and the drawings wherein:

Figure 1 is a central longitudinal sectional view of the novel spindle and mounting assembly;

Figure 2 is an axial sectional view of the inner bearing taken substantially on line 2—2 of Figure 3;

Figure 3 is a rear or inner end view of the bearing shown in Figure 2;

Figure 4 is a fragmentary central longitudinal sectional view of a modified spindle and mounting assembly;

Figure 5 is a rear side view of the conical insert of Figure 4, and

Figures 6 and 7 illustrate in axial section a further modification of the cone insert and of the bearing and cone assembly, respectively.

Describing the invention in detail and referring first to the embodiment shown in Figures 1 through 3 there is seen a fragmentary illustration in Figure 1 of a conventional picker bar generally designated 2 which comprises a tubular portion 3 within which there is mounted a drive shaft 4 carried on a plurality of bearings 5', the shaft being connected at suitable intervals to driving bevel gears 5 which have their teeth 6 meshing with the teeth 7 of the bevel gear 8 which preferably, though not necessarily, are formed integral with the inner end of the shank 9 of a cotton picker spindle generally designated 10.

The thrust side 11 of the gear 8 is formed as a conical segment and mates with a complementary conical surface 12 which is formed in the inner end 13 of the inner cylindrical bearing 14, said surface 12 tapering outwardly toward the tubular or cylindrical portion 15 of the bearing 14 and having an outward extent beyond the outer periphery 16 of the inner bearing inner portion 15 which at its inner end is terminated in an outwardly or outturned radial flange 17 which on its beformentioned inner side is formed with a continuation of the conical surface 12 and at its outer side is formed with a radial shoulder 19 which abuts as at 20 against the inner end of the tubular or cylindrical shaped nut 22 within the bore 23 of which is snugly fitted the cylindrical portion 15 of the inner bearing 14 with the surface 16 thereof engaging with the interior of the nut. It will be seen that the shank portion 9 of the cotton picker spindle is provided with a cylindrical external surface 25 which engages with the complementary close-fitting cylindrical surface 26 on the interior of the bearing portion 15 of the inner bearing. The shank is supported on a cylindrical outer bearing 27 which is spaced outwardly of the inner bearing to provide a lubricant reservoir 28 with the surrounding nut portion between the inner end 29 of the outer bearing 27 and the outer extremity 30 of the inner bearing. The bearing 27 is snugly fitted within the bore 23 adjacent to the outer end of the nut or holder 22. Outwardly of the bearing assembly the picker spindle may be of any shape and is herein shown as provided with a tapered bar conical picker portion 32.

In assemblies which still provide drip type lubrication wherein lubricant is metered to drip upon the various spindle bearings as the spindles are operating, it is necessary to admit the lubricant into the spindle portion 16 and into bearing 27 as well as the chamber 28 and also along the surfaces 11—12 which center the gear 8 with respect to the gear 5. In order to conduct the fluid into the bearing there are provided in the inner end portion 13 a plurality of grooves 34 which interrupt the surface 12 and lead from the inner extremity 35 of the inner end portion 13 of the inner bearing to the bore 26' in the interior of the inner bearing portion 15. This arrangement leads the lubricant into the bearing. Centrifugal slinging of the oil is opposed by the covering relationship of the portion 13 to the mating conical portion 11 of the gear preventing the oil from slinging outwardly and permits it to drain into the bearing.

In order to adapt the many hundreds of thousands of spindles which are currently in use to this improved type of mounting for the spindle to control its relationship with the driving gear an alternate arrangement is shown in Figures 4 and 5 wherein parts corresponding to those shown in the previous embodiment are identified with corresponding reference numerals. It will be seen that in this embodiment the spindle 10a is of conventional design and that the end of the spindle is formed with a gear 8a which is provided with the teeth 7. However, the thrust or outer side surface 50 of the gear is flat and radial and engages a complementary flat radial surface 51 on a conical insert 52 which in turn is provided with a conical surface 11a which mates with and preferably rotates along the surface 12. The member or cone 51 has a central bore 53 which closely fits on the shank portion 9.

Referring now to Figures 6 and 7 there is shown a further optional arrangement and parts corresponding to those in the previous embodiments are identified by corresponding reference numerals. The inner bearing 14 is provided in the surface 12 with a keyway 60 which admits a key 61 formed on the conical surface 11a of the cone generally designated 51a. This application predisposes that the novel lubrication system disclosed and claimed in U. S. Patent 2,743,569 is being used and therefore the advantage of that system together with the centering and the guiding and piloting of the conventional spindle 10a is available.

Thus it will be appreciated that a novel assembly and arrangement has been provided effecting the objects heretofore indicated wherein there are provided a combination radial and thrust bushing having angular thrust surfaces which are provided with a series of passages beginning at the greatest diameter and terminating at the bore of the bushing. The angular thrust surfaces not only provide confinement of the rotating member whereby reducing the dispersal of lubricant which has entered the lubricant conducting passages, but also improved bearing life is obtained by providing a centering angle or bevel on the back face of the bevel spindle gear and a mating angle in the flange of the bearing by increasing the bearing area.

What is claimed is:

1. A cotton picker spindle mounting comprising a picker bar, a drive shaft rotatably mounted therein, a driving bevel gear connected thereto for rotation thereby, a holder mounted on the bar and extending angularly therefrom, bearing means in the holder, a cotton picker spindle having a shank journalled in said bearing means, a driven bevel gear connected to said shank and disposed in mating relation with said driving bevel gear, said bearing means presenting a conical bearing surface proximate to said driven bevel gear, and means operatively associated with said driven bevel gear and presenting a conical surface in complementary engagement with said conical bearing surface for positioning and holding said driven gear in mating relation with respect to said driving gear.

2. A mounting for a cotton picker spindle comprising a tubular holder, bearing means therein comprising a cylindrical part having a cylindrical spindle-journalling bore, an annular radial flange concentric on said cylindrical portion at one end thereof, said flange having a conical bearing surface tapered toward said bore.

3. The invention according to claim 2 and said flange having a plurality of circumferentially spaced grooves interrupting said surface and extending diagonally inwardly from the outer periphery of said flange to said bore.

4. A mounting for a cotton picker spindle comprising a tubular holder, bearing means therein comprising a cylindrical part having a cylindrical spindle-journalling bore, an annular radial flange concentric on said cylindrical part at one end thereof, said flange having a conical bearing surface tapered toward said bore, a spindle having a shank portion journalled in said bore and having a driving gear proximate to said conical surface, and means operatively associated with the gear presenting a conical surface in engagement with said conical bearing surface.

5. The invention according to claim 4 and said means comprising an annular member interposed between said gear and said flange, and said conical surface of said means being on said member.

6. The invention according to claim 5 and means interlocking said member with said bearing means against rotation.

7. The invention according to claim 5 and said member and gear having substantially radial engaging surfaces.

8. The invention according to claim 4 and said means comprising an integral portion on said gear.

References Cited in the file of this patent

UNITED STATES PATENTS

| | | |
|---|---|---|
| 215,782 | Wilson | May 27, 1879 |
| 423,539 | Todd | Mar. 18, 1890 |
| 475,979 | Foote | May 31, 1892 |
| 525,911 | Levedahl | Sept. 11, 1894 |
| 1,217,834 | Santmyers et al. | Feb. 27, 1917 |
| 2,440,767 | Baker | May 4, 1948 |
| 2,669,828 | Hutchins et al. | Feb. 23, 1954 |
| 2,766,574 | Hubbard | Oct. 16, 1956 |